United States Patent [19]
Sopko

[11] Patent Number: 6,003,068
[45] Date of Patent: Dec. 14, 1999

[54] METHOD AND APPARATUS FOR PORTABLY PROVIDING SHARED REMOVABLE RESOURCES TO A PLURALITY OF COMPUTING DEVICES

[75] Inventor: Karen M. Sopko, Plano, Tex.

[73] Assignee: Electronic Data Systems Corporation, Plano, Tex.

[21] Appl. No.: 08/800,673

[22] Filed: Feb. 14, 1997

[51] Int. Cl.⁶ .................................................. G06F 13/00
[52] U.S. Cl. ........................................ 709/205; 709/203
[58] Field of Search ...................... 395/200.33, 200.54, 395/200.47, 200.59, 200.83, 200.5, 200.35; 709/205, 203, 224, 229, 253, 220

[56] References Cited

U.S. PATENT DOCUMENTS

| | | | |
|---|---|---|---|
| 5,276,879 | 1/1994 | Barry et al. | 395/676 |
| 5,301,346 | 4/1994 | Notarianni et al. | 364/528.02 |
| 5,305,183 | 4/1994 | Teynor | 361/686 |
| 5,486,982 | 1/1996 | Hsu | 361/728 |
| 5,671,407 | 9/1997 | Demers et al. | 707/8 |
| 5,692,128 | 6/1993 | Bolles et al. | 395/200.54 |
| 5,790,790 | 8/1998 | Smith et al. | 395/200.36 |
| 5,800,181 | 9/1998 | Heinlein et al. | 434/322 |
| 5,802,305 | 9/1998 | McKaughan et al. | 395/200.57 |

FOREIGN PATENT DOCUMENTS

WO 94/00970   1/1994   WIPO .

Primary Examiner—Zarni Maung
Attorney, Agent, or Firm—L. Joy Griebenow; Baker & Botts L.L.P.

[57] ABSTRACT

An apparatus (120) for providing shared resources to a plurality of external devices (130) includes a portable network server motherboard (210) and a plurality of removable storage devices (220) for selectively configuring the apparatus (120), each storage device (220) storing a different category of resources. The apparatus further includes a plurality of portable removable storage device receivers (230) connecting the plurality of removable storage devices (220) to the portable network server motherboard (210) and a portable hub (216) operable to connect the portable network server motherboard (210) to the plurality of external devices (130).

22 Claims, 4 Drawing Sheets

METHOD AND APPARATUS FOR PORTABLY PROVIDING SHARED REMOVABLE RESOURCES TO A PLURALITY OF COMPUTING DEVICES

TECHNICAL FIELD OF THE INVENTION

This invention relates generally to the field of computer networks and more particularly to a method and apparatus for providing shared resources to a plurality of computing devices.

BACKGROUND OF THE INVENTION

Computer network servers for providing shared resources to a plurality of computers and for exchanging information are well known and have become common in the workplace. Office workers are becoming increasingly dependant upon resources provided to them through a computer network. However, when away from the office, workers often must perform their tasks without the assistance of a computer network. Rather, individual portable computers are often used to provide some resources to workers when away from the office. Although individual portable computers may be useful in some situations, they do not provide a common set of resources comparable to that provided by a computer network that may be shared by a number of individuals, and they do not provide an efficient means for exchanging information. The lack of a common set of resources creates several disadvantages, particularly where a group of individuals is assembled for a common task.

For example, a group of consultants may meet temporarily at a client's office to solve a particular problem posed by the client, or several attorneys may assemble at a hotel in preparation for a trial. In either case, to assist these individuals in executing their tasks, each individual may typically have an individual laptop computer. However, without a computer network, the exchange of information between these individuals is often effected through the exchange of floppy disks, which may be slower than the speed of information exchange offered by a network of computers. Additionally, such exchange of disks increases the possibility of infecting all of the independent computers with any virus that may be contained on one of the independent computers. Furthermore, each individual's independent laptop computer may include different resources than the other laptops. For example, one may use Word Perfect® word processing software while the other may use Microsoft Word®. This lack of a common set of resources may further inhibit efficient information interchange and the overall efficiency of the problem solving team. Moreover, the lack of a common network server inhibits the use of desirable computer software enabling more than one user to access the same data concurrently.

Thus, because of the disadvantages associated with using computers that are not connected together in a network, and as evidenced by the proliferation of computer networks in the office place, it is desirable to provide a set of common resources to a group of individuals working together to perform common tasks. However, although the use of a common network provides several advantages over the use of numerous independent computers, creating a temporary network for workers outside the office is often impractical. To do so often requires a trained network analyst to travel to the desired location of the temporary network to assemble and configure the network. Assembling and configuring a temporary network can be time consuming and expensive, and often the advantages provided by the network do not warrant the added expense. Thus, although computer networks may offer many advantages over a number of independent portable computers, workers often must settle for an inferior alternative when traveling away from the office.

SUMMARY OF THE INVENTION

Therefore, a need has arisen for a new method and apparatus that addresses the disadvantages and deficiencies of the prior art and that can provide shared resources to a plurality of computing devices. The invention comprises a method and apparatus for providing shared resources to a plurality of computing devices. According to one aspect of the invention, a method of providing shared resources to a plurality of computing devices includes providing a portable network server having a plurality of portable removable storage device receivers and a portable hub connected to a portable network server motherboard. The method further includes selecting a first plurality of removable storage devices based on the needs of a first plurality of computing devices for shared resources for connection to the plurality of portable removable storage device receivers. The selected removable storage devices include a first removable storage device storing network software and a second removable storage device storing application software. The method further includes connecting the plurality of removable storage devices in a one-to-one fashion to the plurality of portable removable storage device receivers.

According to another embodiment of the invention, an apparatus for providing shared resources to a plurality of computing devices includes a portable network server motherboard and a plurality of removable storage devices for selectively configuring the apparatus, each storage device storing a different category of resources. The apparatus further includes a plurality of portable removable storage device receivers connecting the plurality of removable storage devices to the portable network server motherboard and a portable hub operable to connect the portable network server motherboard to the plurality of external devices.

The invention provides numerous technical advantages. For example, the invention allows a group of individuals assembled from various different locations to share a common set of resources and a means for exchanging information. According to the invention, these resources may be easily transported from one location to another, thus providing portability to the individuals. In addition such resources may be easily tailored based on the needs of the individuals. Furthermore, according to the invention, configuration of a computer network can be performed at one location and the computer network assembled at a second distant location. Thus, trained network analysts would not necessarily be required to travel to the desired location of the computer network, which reduces the cost associated with forming temporary networks and makes their use more practical.

One aspect of the invention also provides a means for a portable network server to have a fixed electronic mail address. Thus, users of such a portable network server may more easily communicate with computers not served by the portable network server, regardless of the physical location of the users of the portable network server.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

An embodiment of the present invention and its advantages are best understood by referring to FIGS. 1 through 4 of the drawings, like numerals being used for like and corresponding parts of the various drawings.

Figure 1:
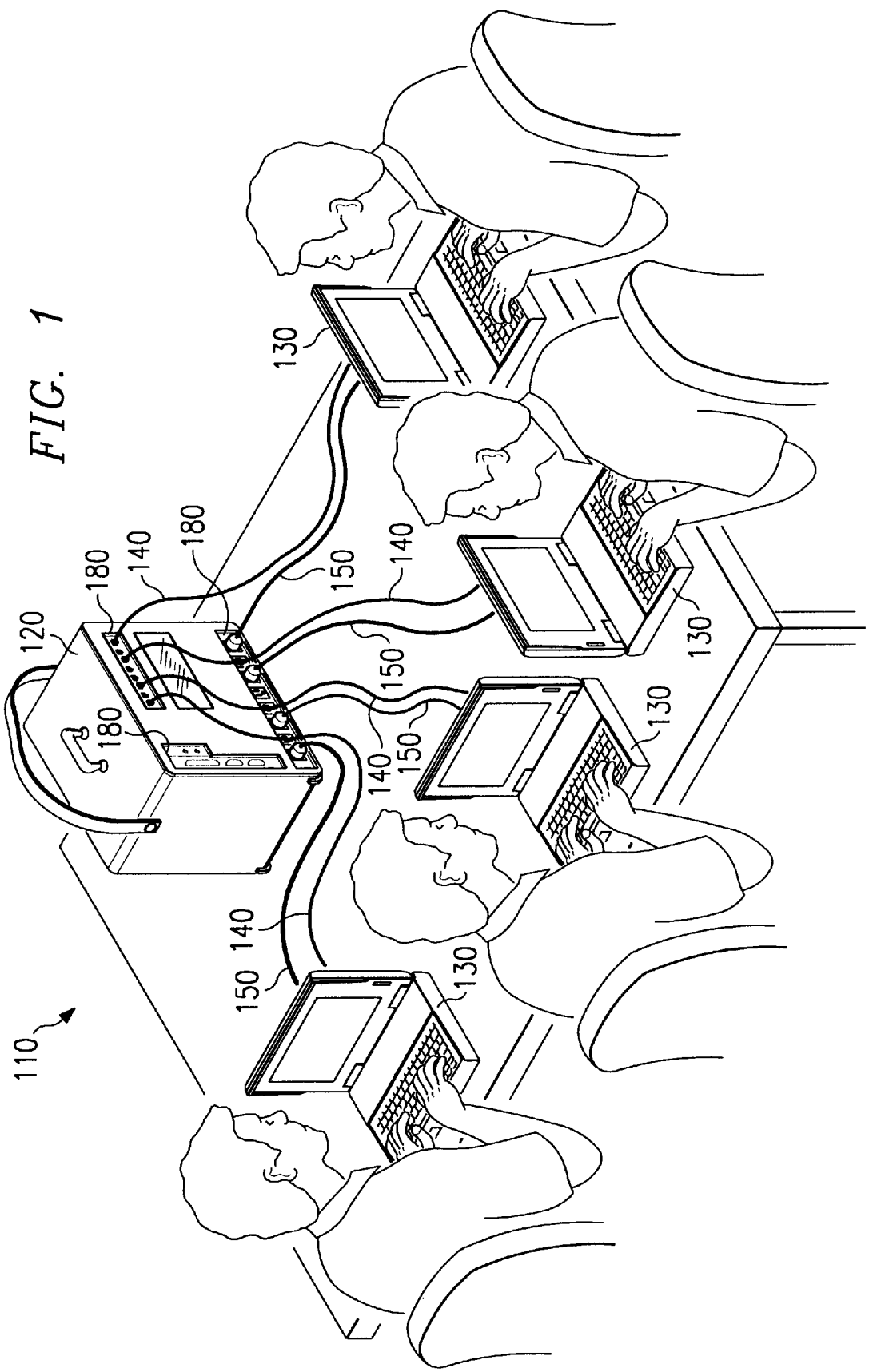
FIG. 1 illustrates an embodiment of a portable network system according to the current invention.

FIG. 1 illustrates an embodiment of a portable network system 110 according to the current invention. Portable network system 110 may include a deployable network server 120 providing resources to a plurality of computing devices 130 through network connections 140. Deployable network server 120 may be accessed by connections 140 through apertures 180. Computing devices 130 may include any type of computing device that may utilize resources provided by a network server and include portable and fixed desktop computers.

Figure 2:
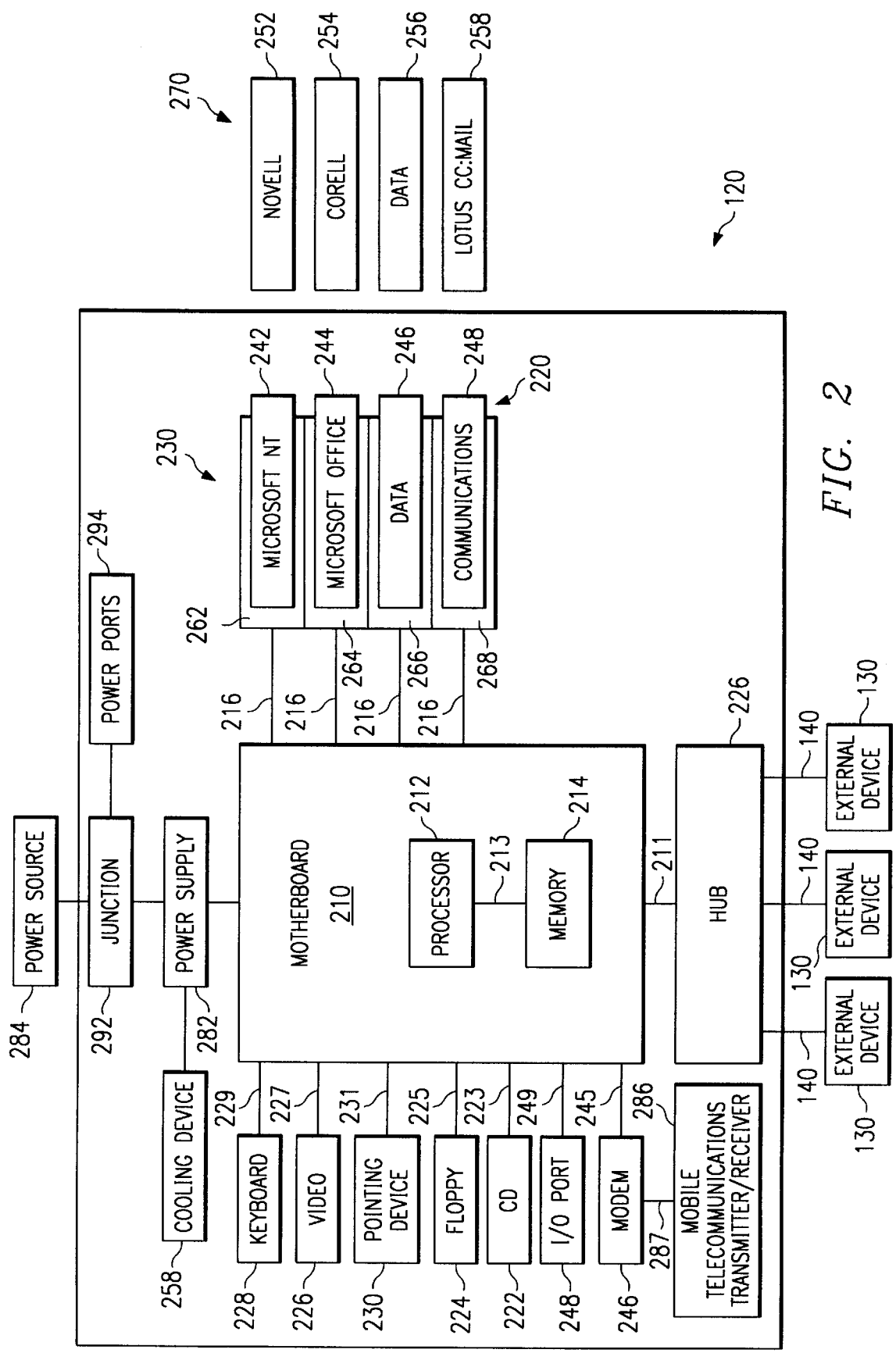
FIG. 2 is a block diagram of one embodiment of the deployable network server illustrated in FIG. 1.

Details of embodiments of deployable network server 120 are described in greater detail in conjunction with FIGS. 2 and 3. In one embodiment, deployable network server 120 may be easily transported from one location to the next to provide shared resources to a plurality of computing devices 130 on a temporary basis in a cost efficient manner. In one embodiment, deployable network server 120 includes all the necessary components to provide network resources to computing devices 130 in one integral device that may be transported by one person. Thus, only one piece of equipment may be required to be transported to provide shared resources to a plurality of computing devices. Network connections 140 may be any type of connection operable to connect a network server to a computing device; however, examples of preferred connections 140 include ethernet connections and token ring connections.

Portable network system 110 allows computing devices 130 to share common resources and efficiently exchange information. Portable network system 110 may be particularly useful for providing resources to a small number of computing devices 130 because, as discussed in greater detail below, it may be easily assembled, transported, and selectively configured. To facilitate portability of portable network system 110, deployable network server 120 may include a power port 294, shown in FIG. 2, for providing electrical power to computing devices 130 through connections 150. Connections 150 may be electrical power cords or other suitable devices for providing power from power port 294 to computing devices 130.

Referring now to FIG. 2, one embodiment of the deployable network server 120 illustrated in FIG. 1 is shown in block diagram form. Deployable network server 120 includes a portable network motherboard 210. Portable network motherboard 210 includes a processor 212 and memory 214 associated with the processor 212 for executing resources stored in network server 120. Connection 213 allows communication between processor 212 and memory 214; however, processor 212 and memory 214 may be formed as one integral electronic device or chip. Portable network motherboard 210 may be operable to execute a variety of types of network software. Examples of such network software include, but are not limited to, Novell, Unix, OS2, and WINDOWS NT®. Portable network motherboard 210 preferably has a size and shape that enables it to be assembled with other necessary components of a network server that is operable to provide shared resources to a plurality of computing devices such that the resulting network server may be easily transported by one person. For example, in the embodiment illustrated in FIG. 3A, portable network server motherboard 210 may be connected with the other components of deployable network server 120 and formed in a carrying case having approximate dimensions of 18"×8"×12"; however, other suitable configurations and dimensions for deployable network server 120 that allow it to be easily transported by one person may be used.

Referring again to FIG. 2, deployable network server 120 includes removable storage devices 220. Removable storage devices 220 store resources, such as computer software, which may be shared by computing devices 130. Removable storage devices 220 are accessed by portable network motherboard 210 through portable storage device receivers 230. Portable storage device receivers 230 provide a temporary connection between removable storage devices 220 and portable network motherboard 210 through storage device receiver connections 216, enabling deployable network server 120 to selectively possess a desired set of resources for shared use by computing devices 130. Storage device receiver connections 216 may be small computer system interface (SCSI) connections or other suitable connections for coupling a motherboard to a storage device.

Portable storage device receivers 230 are preferably formed with a size and shape that enable them to be assembled with other necessary components of a network server that is operable to provide shared resources to a plurality of computing devices such that the resulting network server may be easily transported by one person. Removable storage devices 220 may be hot-swappable storage devices. A hot-swappable storage device is a storage device that may be interchanged with another hot-swappable storage device while an associated network server is operating. During the interchange, data on hot-swappable storage devices are protected from corruption that may occur due to disconnecting hot-swappable storage devices from associated storage device receivers while an associated network server is operating.

Figures 3A, 3B:
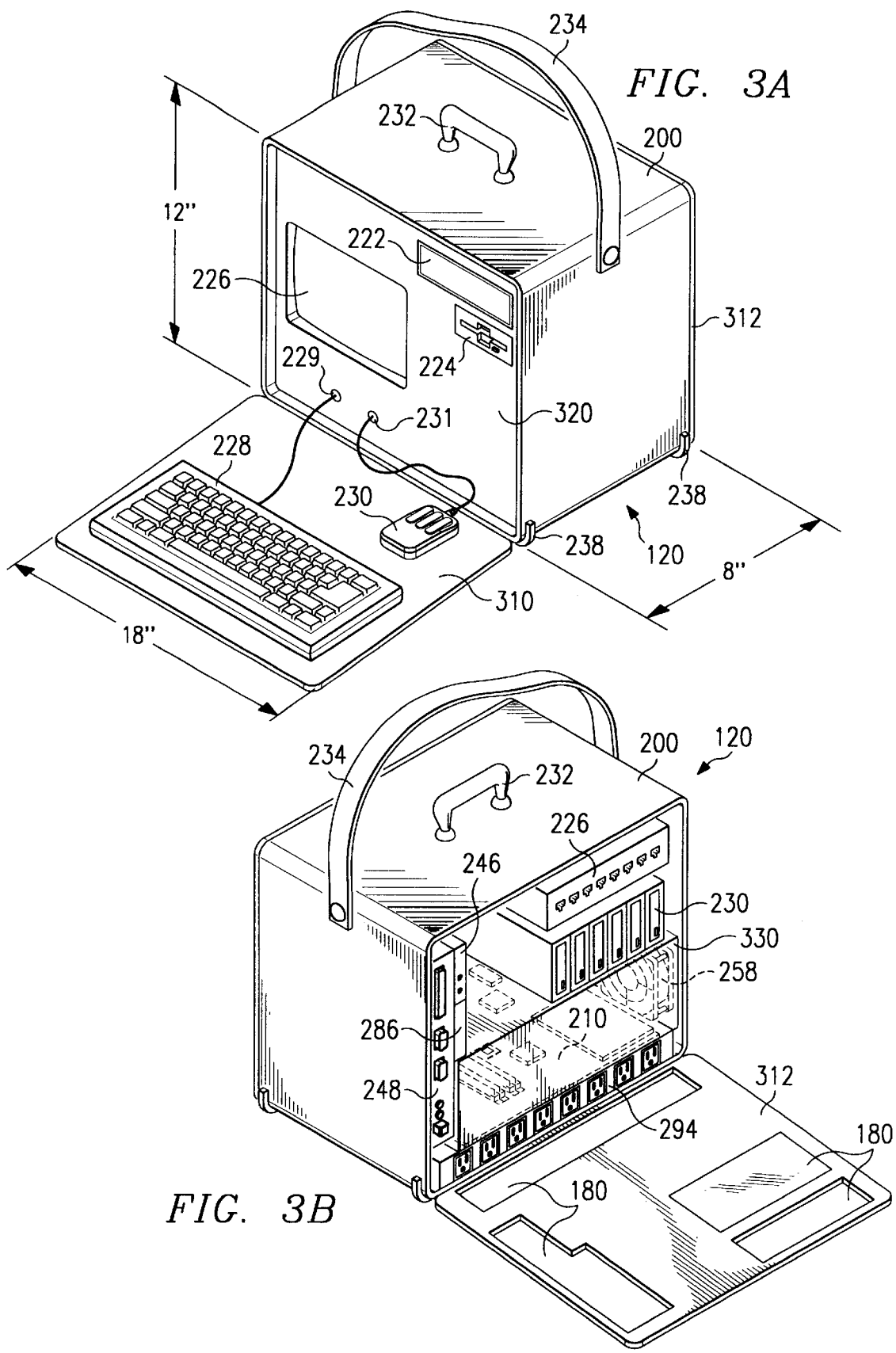
FIGS. 3A and 3B illustrate one embodiment of the deployable network server shown in FIG. 1, showing additional details of the deployable network server.

In one embodiment, removable storage devices 220 include a plurality of hot-swappable disk drives 242, 244, 246, and 248. In that embodiment, storage device receivers 230 include a plurality of hot-swappable drive bays 262, 264, 266, and 268 for receiving the hot-swappable disk drives and for providing a connection between the hot-swappable disk drives and the portable network motherboard 210. Although four removable storage devices 220 and four portable storage device receivers 230 are illustrated in FIG. 2, other suitable numbers of removable storage devices 220 and storage device receivers may be used. In one embodiment, and as illustrated in FIG. 3B, six hot-swappable disk drives and associated receivers are utilized.

Removable storage devices 220 may be selectively engaged with storage device receivers 230 to selectively configure deployable network server 120 with a desired set of resources. To facilitate selective configuration of deployable network server 120, software stored on removable storage devices 220 may be grouped according to function with a different function served by each removable storage device. For example, as shown in FIG. 2, a first hot-swappable storage disk 242 may store network software such as MICROSOFT NT®, a second hot-swappable storage disk 244 may store application software such as MICROSOFT OFFICE®, a third hot-swappable storage disk 246 may store data generated by execution of software stored on one of the other removable storage devices 220, and a fourth hot-swappable storage disk 248 may store communications software such as MICROSOFT MAIL® and additionally store software supporting ethernet connections between computing devices 130 and deployable network server 120. As another example, also shown in FIG. 2, hot-swappable disks 242, 244, 246, and 248 may be replaced with a set 270 of hot-swappable disk drives, which includes for example, hot-swappable disks 252, 254, 256, and 258. Hot-swappable disk 252 may store, for example, Novell network software; hot-swappable disk 254 may store, for example, Cure-all application software; hot-swappable disk 256 may store data, although it may have a different capacity than hot-swappable disk 246; and hot-swappable disk 258 may store LOTUS CC:MAIL® and additionally support token ring connections between computing devices 130 and deployable network server 120. Upon installation, hot-swappable disk 242, which stores network software, may be configured with information describing the contents of the other installed hot-swappable disks 254, 256, and 258. Alternatively, set 270 of removable storage devices 220 may be formed having information describing the intended location of resources stored in the set 270 before coupling with portable storage device receivers 230, allowing use of resources stored in storage devices 220 upon coupling with storage device receivers without subsequent configuration.

By allocating removable storage devices 220 according to function, deployable network server 120 may be easily configured based on the intended requirements for deployable network server 120. Thus, if computing devices 130 require a particular application or communications capability, such can be provided by the selection of the appropriate combinations of removable storage devices 220. Additionally, the formation of a set 270 of removable storage devices 220 before coupling with portable storage device receivers 230 facilitates configuration of deployable network server 120 at remote locations. Thus, set 270 may be configured at one location by a trained systems analyst and transported to a second location for insertion into portable storage device receivers 230 by one of the users of portable network system 110. The ability to configure deployable network server 120 at one location and use it at another location allows for debugging to be performed well in advance of the time the network server 120 is required.

Computing devices 130 may access resources stored in hot-swappable drives 210 and stored within the network motherboard memory through portable hub 226. Portable hub 226 has a size and shape that enables it to be assembled with other necessary components of a network server that is operable to provide shared resources to a plurality of computing devices such that the resulting network server may be easily transported by one person. Portable hub 226 may support any suitable number of connections between computing devices 130 and motherboard 210; however, in one embodiment portable hub 226 provides eight connections, enabling up to eight computing devices 130 to be connected to motherboard 210. Computing devices 130 may be connected to portable hub 226 through a variety of types of connections 140. In one embodiment, connections 140 are RJ-45 connections; however, any connection operable to provide communication between computing devices 130 and portable hub 226 may be used, including for example, ethernet and token ring connections. In one embodiment, the number of computing devices 130 is small enough that a network card (not explicitly shown) is not used to facilitate communication between computing devices 130 and motherboard 210 via portable hub 226. Portable hub 226 may function to allocate priorities to conflicting requests for the deployable network server 120 by computing devices 130. Connection 211 allows communication of portable hub 226 with motherboard 210 and may be a direct electrical connection.

Computing devices 130 may be powered by power ports 294 (connection not explicitly shown in FIG. 2), which may be an electrical power strip formed as part of deployable network server 120. Power ports 294 receive power from a power source 284, which may be a common electrical outlet, through junction 292. Also receiving power from power source 284 through junction 292 is a power supply 282. Power supply 282 provides power to portable motherboard 210. Junction 292 may be a surge protector and also provide power status to the portable motherboard 210 or to a visual indicator (not explicitly shown). A cooling device 258, such as a cooling fan, may also be powered by power port 282 to remove heat generated by the motherboard 210. As shown in FIG. 3B, cooling device 258 may be situated to optimize cooling of motherboard 250 because of the increased heat due to compact nature of network server 110.

Deployable network server 120 may also include a plurality of input/output devices connected to the portable network motherboard 210 for communicating with the deployable network server 120. These input/output devices may include a keyboard 228, a video display 226, a pointing device 230, and a floppy disk drive 224. These devices may be connected to portable network motherboard through direct electrical connections 229, 227, 231, and 225, respectively; however, other suitable connections may be used. In addition deployable network server 120 may also include an input/output port 248 for connecting portable network motherboard 210 to additional external devices, such as a printer (not explicitly shown). Input/output port 248 may be a standard serial/parallel card and may be connected to network server motherboard 210 through a direct electrical connection 249 or other suitable connection. Furthermore, a modem 246 may be connected to the portable network motherboard 210 through connection 245 for providing a means of communication between deployable network server 120 and remote computers or networks (not explicitly shown). Connection 245 may be a direct electrical connection or other suitable connection for coupling a modem to a motherboard.

In one embodiment, network server 120 is operable to possess a constant electronic address, such as an internet address, regardless of its physical location through, for example, the use of a portable telecommunications transmitter/receiver 286 connected to modem 246 through electrical connection 287. One example of a portable communications transmitter/receiver 286 is a cellular phone. Thus, through the use of a cellular phone formed as part of deployable network server 120, computers that are not part of portable network server 110 may communicate with deployable network server 120 regardless of its physical location.

Deployable network server 120 may also include a compact disc drive 222, which may be connected to motherboard 210 through SCSI connection 223 or other suitable connection. Any power required by the above-described input/output devices and the storage device receives 230 may be received directly from portable motherboard 210, from power supply 282, or through other suitable techniques.

FIGS. 3A and 3B illustrate one physical implementation of the deployable network server 120 illustrated in FIG. 1, showing additional details of the deployable network server 120. In the embodiment illustrated in FIGS. 3A and 3B, deployable network server 120 includes portable carrying device 200 surrounding motherboard 210, hub 220, and portable storage device receivers 230 for facilitating transportation to desired locations. In the embodiment illustrated in FIGS. 3A and 3B, portable carrying device 200 is a flight bag; however, carrying device 200 may include any type of carrying device that may be carried by a single person. It may be particularly advantageous for transporting deployable network server 120 for portable carrying device 200 to conform to size standards for carry-on luggage required by major airlines. Carrying device 200 may include a fold-down front 310 and fold-down back 312 for providing easy access to various components of deployable network server 120. Fold-down back 312 may include apertures 180 for providing access to hub 236, removable storage device receivers 230, power ports 294, and input/output port 248 while fold-down back 312 is in an upright position. Compartment 330 encases network motherboard 210 and fan 258 to minimize dust and static. Carrying device 200 may also include a handle 232 and shoulder strap 234 to further facilitate transportation and may be formed with ruggedized portions 238 to protect deployable network server 120 during transportation.

Referring now to FIG. 3A, video display 226, compact disk drive 222, and floppy disk drive 224 are illustrated as accessible through front flap 310 and formed in interior front face 320. In addition, keyboard 228 may connect to portable network motherboard 210 (FIG. 3B) through keyboard input port 229 formed in an interior front face 320 of deployable network server 120. Pointing device 230 may connect to portable network motherboard 210 through pointing device input port 231 formed in interior front face 320 of deployable network server 120. Keyboard 228 may optionally be formed integral with front flap 310. Although a particular orientation for video display 226, compact disk drive 222, floppy disk drive 224, keyboard 228, and pointing device 230 is shown, other suitable alternative orientations for these components may be employed.

Referring now to FIG. 3B, portable network motherboard 210 is illustrated in a horizontal position overlying power ports 294; however, any suitable orientation that allows portable network motherboard 210 to fit within portable carrying case 200 may be used in this embodiment. Cooling device 258 may be oriented to provide fluid flow directly over portable network motherboard 210 to enhance heat transfer from deployable network server 120 to the surrounding environment. Input/output port 248, modem 246, and portable telecommunications transmitter/receiver 286 may be oriented vertically in this embodiment as illustrated in FIG. 3B; however, any suitable orientation that allows these components to fit within portable carrying case 200 or attached to portable carrying case 200 may be used in this embodiment. Portable hub 226 may be positioned, as shown, overlying portable storage device receivers 230. Portable storage device receivers 230 are illustrated in FIG. 3B as being positioned for receiving removable storage devices 220 through apertures 180 of back flap 312 of portable carrying device 200; however, other suitable orientations for hub 226 and storage device receivers 230 that allow portable hub 226 and storage device receivers to fit within portable carrying case 200 may be utilized in this embodiment.

Figure 4:
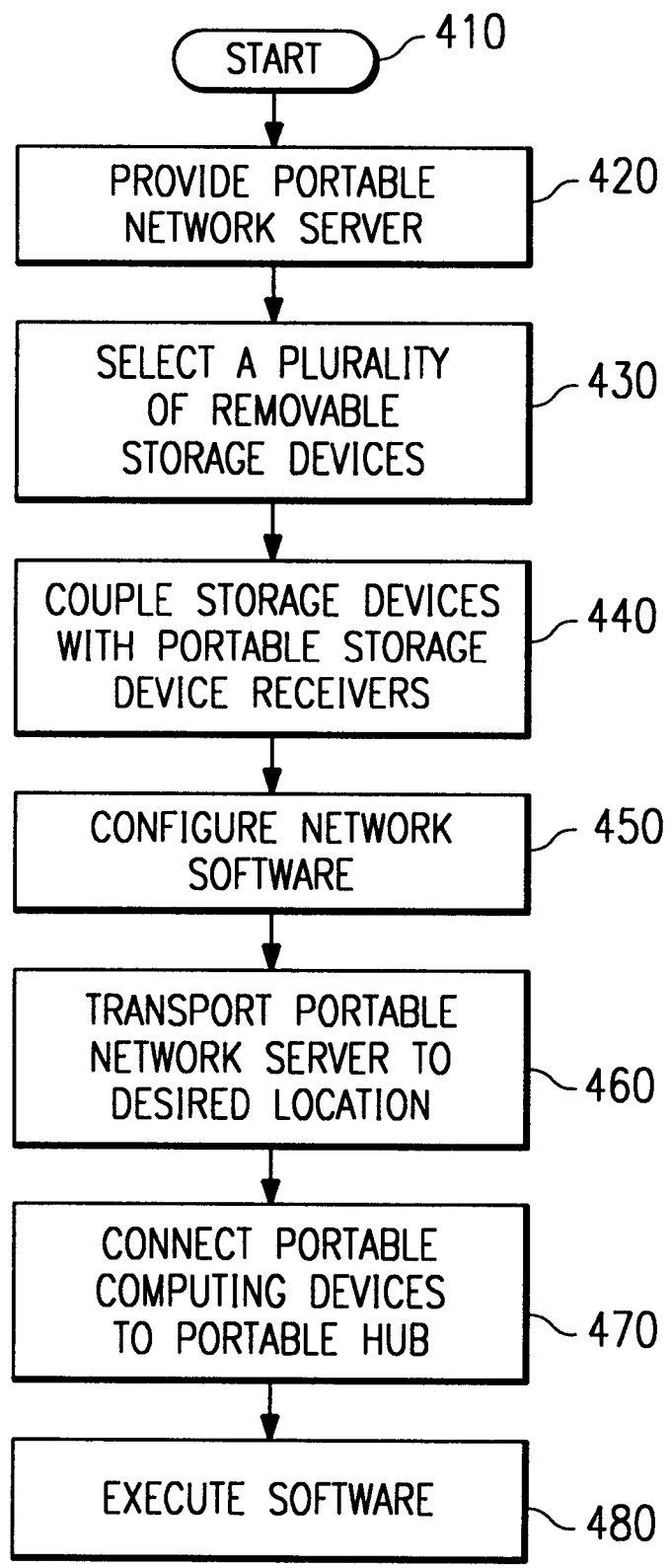
FIG. 4 is a flow chart illustrating one method for providing shared resources to a plurality of computing devices.

FIG. 4 is a flow chart illustrating the operation of deployable network server 120 and a method for providing shared resources to a group of users. The method begins at step 410. At step 420 a deployable network server, such as deployable network server 120, is provided. At step 430 a plurality of removable storage devices 220 having desired resources is selected based on the requirements of a particular application. For example, a proposal team may require a particular type of word processing software that functions with a particular type of network software and, in addition, a particular type of electronic mail package. At step 440, removable storage devices 220 are then coupled with portable storage device receivers 230 on deployable network server 120. At step 450, the network software stored on one of the selected removable storage devices 220 may then be configured based on the contents and location of software stored on other removable storage devices 220; however, such configuration, if needed, may alternatively be performed before coupling removable storage devices 220 with storage device receivers 230. One method for configuring network software before coupling removable storage devices 220 with storage device receivers 230 is to configure the network software while storage devices 220 are inserted into a second network server having storage device receives capable of receiving storage devices 220. In this manner, a set of removable storage devices, such as set 270, may be pre-configured so they may be accessed upon coupling with storage device receivers 230 without additional configuration. This procedure facilitates formation of a portable network such as network 110 without requiring a trained systems analyst to travel to the location of the network.

At step 460, network server is then transported to the desired location of a network. Deployable network server 120 may then be plugged into a power source 284 and front flap 310 may be lowered to provide access to keyboard 228, video display 226, pointing device 230, floppy disk drive 224, and compact disk drive 222 to facilitate use of deployable network server 120. It should be noted that step 460 could occur before or after coupling removable storage devices 220 with storage device receivers 230. After transporting of network server 120 to the desired location of the network, a plurality of portable computing devices 130 may be connected to deployable network server 120 through connections 140 and hub 226. In addition, the plurality of portable computing devices 130 may also be powered by power ports 294. Resources stored on removable storage devices 220 may then be accessed and utilized by computing devices 130. In this manner, a plurality of computing devices may share a common set of resources and efficiently exchange information. In addition, these resources may be selectively and easily configured through organizing software by category on removable storage devices 220.

Although the invention has been particularly shown and described by the foregoing detailed description, it will be understood by those skilled in the art that various other changes in form and detail may be made without departing from the spirit and scope of the invention.

What is claimed is:

1. A portable server for selectively providing resources to a plurality of computing devices, the portable server comprising:
   a portable network server motherboard;
   a plurality of removable storage devices, each removable storage device storing a different category of resources;
   a plurality of portable removable storage device receivers connecting the plurality of removable storage devices to the portable network server motherboard; and
   a portable hub operable to connect the portable network server motherboard to the plurality of computing devices.

2. The portable server of claim 1 wherein the plurality of removable storage devices comprise a plurality of hot-swappable disk drives.

3. The portable server of claim 1 and further comprising a portable carrying case surrounding the portable network server motherboard, the plurality of removable storage devices, the plurality of portable removable storage device receivers, and the portable hub.

4. The portable server of claim 3 and further comprising a cooling device located within the portable carrying case for cooling the portable network server motherboard.

5. The portable server of claim 1 wherein the plurality of removable storage devices comprises a first hot-swappable storage device storing all network software accessible by the portable network motherboard and a second hot-swappable storage device storing all application software accessible by the portable network motherboard.

6. The portable server of claim 2 wherein the plurality of hot-swappable disk drives comprises:
   a first hot-swappable disk drive storing software consisting essentially of network software;
   a second hot-swappable disk drive storing software consisting essentially of application software;
   a third hot-swappable disk drive storing data generated by execution of the application software stored on the second hot-swappable disk drive; and
   a fourth hot-swappable disk drive storing software consisting essentially of communications software.

7. The portable server of claim 1 and further comprising a modem connected to the portable network server motherboard.

8. The portable server of claim 7 and further comprising a portable telecommunications transmitter/receiver connected to the modem.

9. A method for portably providing shared resources to computing devices, the method comprising the steps of:
   providing a portable network server having a plurality of portable removable storage device receivers and a portable hub connected to a portable network server motherboard;
   providing a plurality of removable storage devices, a first selected plurality of the removable storage devices comprising a first removable storage device storing all network software accessible by the portable network server motherboard and a second removable storage device storing all application software accessible by the portable network server motherboard; and
   connecting the plurality of removable storage devices in a one-to-one fashion to the plurality of portable removable storage device receivers.

10. The method of claim 9 and further comprising configuring the first removable storage device based on the first selected plurality of removable storage devices.

11. The method of claim 9 and further comprising configuring the first removable storage device based on the first selected plurality of removable storage devices before connecting the first removable storage device to its associated portable removable storage device receiver.

12. The method of claim 9 wherein the first selected plurality of removable storage devices further comprises a third removable storage device for storing data generated by the execution of software on the second removable storage device.

13. The method of claim 9 and further comprising:
   transporting the portable network server from a first location to a second location in a portable carrying case;
   connecting a plurality of portable computing devices to the portable hub; and
   executing a portion of the application software in response to information communicated by one of the portable computing devices to the portable network motherboard.

14. The method of claim 9 and further comprising:
   connecting the portable network server to a telecommunications transmitter-receiver;
   transporting the portable network server and the telecommunications transmitter-receiver to a first location;
   connecting the plurality of computing devices to the portable hub; and
   accessing a network of computers through the computing devices, portable hub, and telecommunications transmitter-receiver.

15. The method of claim 14 wherein the step of executing a portion of the application software occurs while the portable hub is within a portable carrying case.

16. The method of claim 9 and further comprising a second selected plurality of removable storage devices based on the needs of a further plurality of computing devices, the second selected plurality of removable storage devices different from the first selected plurality of removable storage devices.

17. The method of claim 9 wherein each removable storage device stores a different category of resources.

18. A portable computer network system comprising:
   a plurality of portable computing devices; and
   a deployable network server comprising:
      a portable carrying device for facilitating transportation of the deployable network server;
      a portable network motherboard being disposed within the portable carrying device;
      a plurality of removable storage devices;
      a plurality of portable removable storage device receivers being disposed within the portable carrying device and connecting the portable network motherboard to the plurality of removable storage devices and having at least one of the removable storage devices disposed within at least one of the portable removable storage device receivers;
      a portable hub being disposed within the portable carrying device and connected to the portable network motherboard for connecting the plurality of portable computing devices to the portable network motherboard; and
      the portable carrying device formed with an aperture being disposed proximate to the portable hub and oriented such that a plurality of connections may be made through the aperture between the portable hub and the plurality of portable computing devices.

19. The system of claim 18 wherein each of the plurality of removable storage devices stores a different category of resources.

20. The system of claim 18 and further comprising a keyboard formed integral with the portable carrying device.

21. The system of claim 18 wherein the deployable network server further comprises an electrical power port formed within the portable carrying device and wherein the portable computing devices are powered by the electrical power port.

22. The system of claim 18 wherein the plurality of removable storage devices comprises a plurality of hot-swappable disk drives comprising:
   a first hot-swappable disk drive storing all network software accessible by the portable network motherboard;

a second hot-swappable disk drive storing all application software accessible by the portable network motherboard;

a third hot-swappable disk drive storing all communications software accessible by the portable network motherboard; and a fourth hot-swappable disk drive storing data generated by execution of the application software stored on the second hot-swappable disk drive in response to information received by the network motherboard from one of the plurality of portable computing devices.

* * * * *